United States Patent [19]

Hashimoto et al.

[11] Patent Number: 4,967,067
[45] Date of Patent: Oct. 30, 1990

[54] SIGNAL READ-OUT CIRCUIT WHICH LOWERS DIFFUSION CAPACITANCE BY LIMITING EMITTING CURRENT WITH RESISTIVE ELEMENTS

[76] Inventors: Seiji Hashimoto; Tamotsu Satoh; Shigetoshi Sugawa, all c/o Canon Kabushiki Kaisha: 30-2, 3-chome, Shimomaruko, Ohta-ku, Tokyo, Japan

[21] Appl. No.: 364,493

[22] Filed: Jun. 9, 1989

Related U.S. Application Data

[63] Continuation of Ser. No. 133,384, Dec. 15, 1987, abandoned.

[30] Foreign Application Priority Data

Dec. 28, 1986 [JP] Japan ................................. 61-302211
May 25, 1987 [JP] Japan ................................. 62-125924

[51] Int. Cl.$^5$ ............................................. H01J 40/14
[52] U.S. Cl. ............................. 250/208.1; 358/213.27
[58] Field of Search .................... 250/578; 358/213.11, 358/215.15, 213.16, 213.27

[56] References Cited

U.S. PATENT DOCUMENTS

| 3,676,590 | 7/1972 | Weimer . | |
|---|---|---|---|
| 3,856,989 | 12/1974 | Weimer | 250/578 |
| 4,291,337 | 9/1981 | Takamura et al. . | |
| 4,571,624 | 2/1986 | Nishizawa et al. | 250/578 |
| 4,598,320 | 7/1986 | Arques . | |
| 4,651,016 | 3/1987 | Hirao | 250/578 |
| 4,673,821 | 6/1987 | Morita | 250/578 |
| 4,686,554 | 8/1987 | Ohmi et al. | 357/30 |

FOREIGN PATENT DOCUMENTS 0128828 12/1984 European Pat. Off. .
60-91666 5/1985 Japan .

Primary Examiner—David C. Nelms
Assistant Examiner—Khaled Shami

[57] ABSTRACT

A signal reading circuit has amplifiers for respectively receiving a plurality of signals. The circuit reads out the outputs of the amplifiers to a signal line through resistor elements, wherein each resistor element is a resistance when a switching device is conductive.

16 Claims, 8 Drawing Sheets

SIGNAL READ-OUT CIRCUIT WHICH LOWERS DIFFUSION CAPACITANCE BY LIMITING EMITTING CURRENT WITH RESISTIVE ELEMENTS

This application is a continuation of application Ser. No. 133,384 filed Dec. 15, 1987, now abandoned.

BACKGROUND OF THE INVENTION

1. Field of the Invention

The present invention relates to a signal read out circuit to read out a plurality of signals to a signal line.

The invention also relates to a photoelectric converting apparatus and, more particularly, to a photoelectric converting apparatus formed on a semiconductor substrate.

2. Related Background Art

Figure 6A:
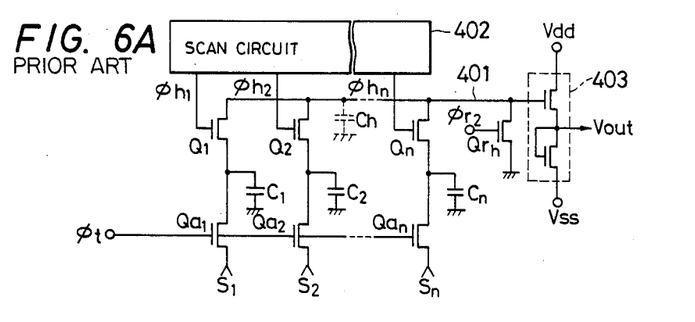
FIGS. 6A and 6B are circuit diagrams showing an example of a conventional signal reading circuit and a photoelectric converting apparatus, respectively.

FIG. 6A is a circuit diagram showing an example of a conventional signal read-out; and circuit.

In the diagram, after a plurality of signals $S_1$ to $S_n$ are accumulated in capacitors $C_1$ to $C_n$ having a capacitance $C_t$, they are sequentially read out to a signal line 401 through switching transistors $Q_1$ to $Q_n$ and output from an amplifier 403. The switching transistors $Q_1$ to $Q_n$ are turned on or off by scan pulses $\phi_{h1}$ to $\phi_{h2}$ which are output from a scan circuit 402.

However, the conventional circuit has the following problems.

(1) Since the signal line 401 has a stray capacitance $C_h$, when the signals are transferred from the capacitance $C_t$ of the capacitors $C_1$ to $C_n$ to the capacitance C, the signal level of the signal line 401 is decreased by capacitance division to a value which is $C_t/(C_t+C_h)$ times as low as the level when the signals were accumulated in the capacitors.

In particular, in the case of a high density sensor or the like which has a large number n of signals, the capacitance $C_h$ of the signal line 401 increases, so that the output remarkably decreases.

(2) As a method of preventing the decrease in output, it may be considered to enlarge the capacitance $C_t$, but this results in an increase in load capacitance of the sensor where signals $S_1$ to $S_n$ are the outputs of the sensor. There then occurs a new problem such that the speed of transfer of a sensor signal S to the capacitors decreases and a high speed operation cannot be performed.

On the other hand, in the conventional photoelectric converting apparatuses using such a reading circuit, there is also a photoelectric converting apparatus in which the signals generated and accumulated in the photoelectric converting areas are transferred to a first capacitive area such as a vertical line or the like provided separately from the photoelectric converting areas. Then the signals accumulated in the first capacitive area are transferred to a second capacitive area such as a horizontal output line or the like, and the signals accumulated in the second capacitance area are output. An example of such a conventional photoelectric converting apparatus will be explained with reference to FIG. 6B.

Figure 6B:
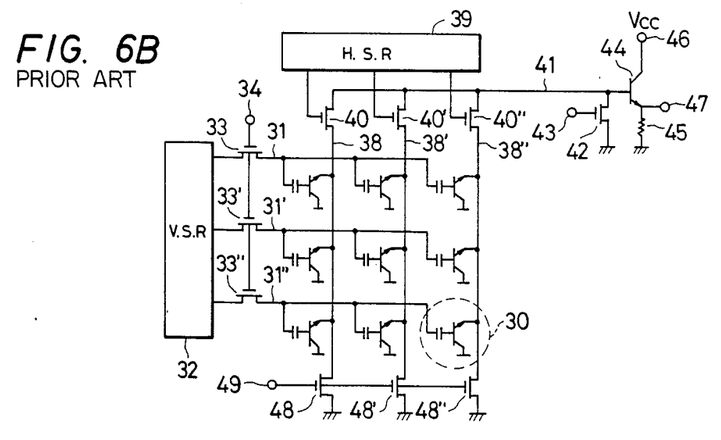

FIG. 6B is a circuit diagram of a photoelectric converting apparatus in which fundamental photosensor cells 30 are two-dimensionally arranged in a matrix form of 3×3.

In FIG. 6B, reference numeral 30 denotes the fundamental photosensor cells which are constituted in the following manner. The carriers generated in the PN junction portion of a bipolar transistor by light excitation are accumulated in a base region. An output line connected to an emitter region is set in the floating state. By applying positive pulses to the base through a capacitor connected thereto, the carriers accumulated in the base region are read out so as not to be destroyed. The output line connected to the emitter region is, for example, grounded. By applying positive pulses to the base through the capacitor, the carriers accumulated in the base region are erased. The photoelectric converting apparatus in FIG. 6B will now be described with reference to the diagram. The conventional photoelectric converting apparatus in FIG. 6B comprises horizontal lines 31, 31', and 31" to apply readout pulses and refreshing pulses; a vertical shift register 32 to generate the readout pulses and refreshing pulses; a terminal 34 to apply gate pulses to buffer MOS transistors 33, 33', and 33" which are arranged among the vertical shift register 32 and the horizontal lines 31, 31', and 31"; vertical lines 38, 38', and 38" to read out the accumulated voltages from the fundamental photosensor cells 30; a horizontal shift register 39 to generate pulses to select each vertical line; MOS transistors 40, 40', and 40" for gates to open or close each vertical line; a horizontal output line 41 to read out the accumulated voltages to an amplifying section; a MOS transistor 42 to refresh the charges accumulated and held in the output line 41 after they were read out; a terminal 43 to apply the refreshing pulse to the MOS transistor 42; a transistor 44 such as bipolar transistor, MOS-FET, J-FET, or the like to amplify the output signal; a load resistor 45; a terminal 46 to connect the transistor with a power source; an output terminal 47 of the transistor; MOS transistors 48, 48', and 48" to refresh the charges accumulated in the vertical lines 38, 38', and 38" in the reading operation; and a terminal 49 to apply pulses to gates of the MOS transistors 48, 48', and 48". In such a photoelectric converting apparatus, a pulse is first applied to the terminal 49, thereby turning on the MOS transistors 48, 48', and 48". The vertical lines 38, 38', and 38" are previously grounded and cleared. Next, the MOS transistors 48, 48', and 48" are turned off. Pulses are applied through the MOS transistors 33, 33', and 33" to the horizontal lines 31, 31', and 31" selected by the vertical shift register 32. The signals of the photosensor cells 30 are read out to the vertical lines 38, 38', and 38" in the floating state. The vertical lines 38, 38', and 38" have a peculiar capacitive component. The signals corresponding to the signals of the photosensor cells are held in the capacitance of the vertical lines by the reading operations. Next, the MOS transistors 40, 40' and 40" are then sequentially selected by the horizontal shift register 39. The signals held in the peculiar capacitance of the vertical lines 38, 38', and 38" are applied through the horizontal line 41 to a control electrode of the transistor 44. The signals corresponding to the outputs of the photosensor cells 30 are sequentially output from the terminal 47.

On the other hand, when the pulses are being applied through the capacitors connected to the bases of the photosensor cells 30 after that, if the pulses are applied to the terminal 49 and the vertical lines 38, 38', and 38" are grounded, the carriers accumulated in the base regions can be erased.

Even in the foregoing conventional photoelectric converting apparatus, when the signals held in the peculiar capacitance of the vertical lines 38, 38', and 38" are sequentially applied through the horizontal line 41 to the control electrode of the transistor 44, the level of the signal which is applied to the transistor 44 is determined by the ratio of the peculiar capacitance of the horizontal line 41 and the peculiar capacitance of the vertical lines 38, 38', and 38" which are accessed by the horizontal register 39. Thus, this signal level decreases in dependence on the dividing ratio of the capacitance.

Such a reduction in signal level still becomes typical with an increase in the number of horizontal pixels. This is because the capacitance of the horizontal line 41 substantially increases in proportion to the number of MOS transistors 40, 40', 40", ... for gating.

Therefore, to avoid the reduction in signal level, it is necessary to further increase the capacitance of the vertical lines or to use a multi-output line system in which the horizontal line is divided and the signals are read out.

However, there are drawbacks and problems such that the former method causes an increase in chip area and the latter method causes an increase in the number of output terminals, i.e., number of pins.

On the other hand, as another method, there may be considered an idea such that by inserting an amplifier between the vertical line and the horizontal line, the reduction in signal level is prevented. However, this method has a drawback such that since a constitution of the amplifying section is complicated, the chip area increases and a constitution of the horizontal shift register section becomes further complicated

SUMMARY OF THE INVENTION

It is an object of the present invention to provide a signal read-out circuit which can solve the foregoing problems.

Another object of the invention is to provide a signal read-out circuit in which a reduction in output is small.

Still another object of the invention is to provide a photoelectric converting apparatus having a simple constitution.

A signal read-out circuit according to an embodiment of the invention has amplifiers for respectively receiving a plurality of signals, in which each output of the amplifiers is read out to a signal line through resistor means.

Since the signals are read out to the signal line by the amplifier and resistor means constituted as explained above, for example, even in the case where the signals are transferred from an accumulation capacitance $C_t$ to a capacitance $C_h$ of the signal line, the gain can be set to about 1. The conventional problem of the reduction in signal level can be solved. On the other hand, the accumulation capacitance $C_t$ as the load capacitance can be reduced due to this and high speed operations can be performed.

On the other hand, since the amplifier drives the signal line through the resistor means, the output current of the amplifier is limited by the resistor means. Therefore, for example, if a bipolar transistor is used as the amplifier, an increase in diffusion capacitance between the base and the emitter can be prevented. A variation in readout signal due to a variation in diffusion capacitance can be suppressed.

To accomplish the above objects, another embodiment of the invention comprises a plurality of photoelectric converting pixels; a plurality of capacitor means each for temporarily storing a signal of each pixel; a plurality of first amplifiers for sequentially amplifying the signals held in the respective capacitor means, in which the number of first amplifiers is less than the number of capacitor means; and a common second amplifier for commonly amplifying outputs of the plurality of amplifiers.

The signals formed in a plurality of photoelectric converting pixels are temporarily stored in a plurality of capacitor means. When the accumulated signals are sequentially read out, the outputs are amplified by the first amplifiers whose number is less than the number of capacitor means and thereafter, the amplified outputs are read out and transmitted to the common second amplifier. Therefore, the reduction in output by the division of the capacitance does not occur and the first amplifiers do not need to be provided for all of the capacitor means. Thus, the constitution is simplified.

The above and other objects and features of the present invention will become apparent from the following detailed description and the appended claims with reference to the accompanying drawings

DETAILED DESCRIPTION OF THE PREFERRED EMBODIMENTS

Embodiments of the present invention will be described in detail hereinbelow with reference to the drawings.

Figure 1:
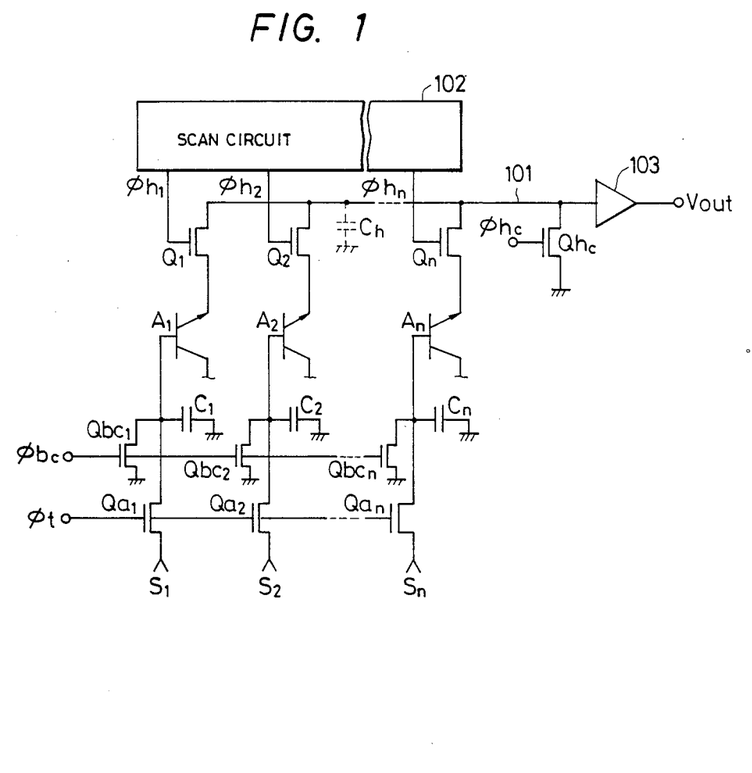
FIG. 1 is a circuit diagram of an embodiment of a signal read-circuit according to the present invention.

FIG. 1 is a circuit diagram of an embodiment of a signal read-out circuit according to the invention.

In the diagram, a plurality of signals S ($S_1$ to $S_n$) are accumulated in accumulation capacitors C ($C_1$ to $C_n$) having a capacitance $C_t$ through transfer transistors $Q_a$ ($Q_{a1}$ to $Q_{an}$).

Pulses $\phi_t$ are commonly input to gate electrodes of the transistors $Q_a$, thereby turning on or off each transistor.

On the other hand, resetting transistors $Q_{bc}$ ($Q_{bc1}$ to $Q_{bcn}$) are connected in parallel with the capacitors C. Reset pulses $\phi_{bc}$ are input to gate electrodes of the transistors $Q_{bc}$, respectively.

The signals accumulated in the capacitors C are amplified by amplifiers A and output to emitters. In this state, the scan pulses $\phi_{h1}$ to $\phi_{hn}$ are sequentially output from a scan circuit 102, thereby sequentially turning on the switching transistors Q ($Q_1$ to $Q_n$) and sequentially reading out output signals of the amplifiers A to a signal line 101. The signals read out to the signal line 101 are output to the outside through an output amplifier 103. However, each time one signal is output, a transistor $Q_{hc}$ is turned on by the pulse $\phi_{hc}$ and the signal line 101 is cleared.

In this manner, the outputs of the amplifiers A are read out to the signal line 101 through the switching transistors Q. Namely, the outputs of the amplifiers A are read out to the signal line 101 through the transistors Q, respectively.

With this constitution, a variation in output signal which is generated due to the amplifier A can be suppressed. For example, a fixed pattern noise generated when the image signals S are reproduced can be suppressed. The reasons for these suppressing effects will now be explained hereinbelow.

When the accumulation signal S in the capacitor C is input to the base of the amplifier A, the signal output to the emitter side is returned to the base by the capacitance $C_{be}$ between the base and the emitter. At this time, if the capacitances $C_{be}$ of the amplifiers are different, this causes a variation in output signal.

On the other hand, in general, the base-emitter capacitance $C_{be}$ in the bipolar transistor dominantly depends on a junction capacitance $C_{bej}$ when the circuit between the base and the emitter is in the reverse bias state, while the capacitance $C_{be}$ dominantly depends on a diffusion capacitance $C_{de}$ when the circuit between the base and the emitter is in the forward bias state. On the other hand, it is also known that the diffusion capacitance $C_d$ increases in accordance with an emitter current. Therefore, in the case of an npn type bipolar transistor used in the amplifier A in this embodiment, when the signal S is input to the base and the circuit between the base and the emitter changes in the forward biasing direction, the base-emitter capacitance $C_{be}$ dominantly depends on the diffusion capacitance $C_{de}$. Further, the capacitance $C_{de}$, i.e., $C_{be}$ increases with an increase in emitter current. When the values of $C_{de}$ of the respective amplifiers A are different, the output signals are returned to the bases as mentioned above, so that a variation in output signal occurs.

Therefore, to prevent the variation in output signal, it is necessary to suppress an increase in diffusion capacitance $C_{de}$. For this purpose, the emitter current needs to be limited.

Therefore, as shown in FIG. 1, the embodiment has a constitution such that the emitter current of the amplifier A is limited by use of the ON resistance of the switching transistor Q.

For example, when the scan pulse $\phi_{h1}$ is output from the scan circuit 102 and the switching transistor $Q_1$ is turned on, the emitter current corresponding to the signal $S_1$ is transmitted from the amplifier $A_1$ through the transistor $Q_1$ and flows into the capacitance $C_h$ of the signal line 101. At this time, since the emitter current is limited by the ON resistance of the transistor $Q_1$, the increase in diffusion capacitance $C_{de}$ between the base and the emitter of the amplifier $A_1$ is limited. The same shall also apply to the other amplifiers $A_2$ to $A_n$. Thus, the signals which are read out to the signal line 101 are obtained as the signals from which a variation due to the amplifiers A was eliminated.

An example of an image pickup device using this embodiment will now be explained.

First, a photosensor which is used in this image pickup device will be explained. The photosensor itself has fundamentally been disclosed in Japanese patent Application No. 120751/1983.

Figure 2A:
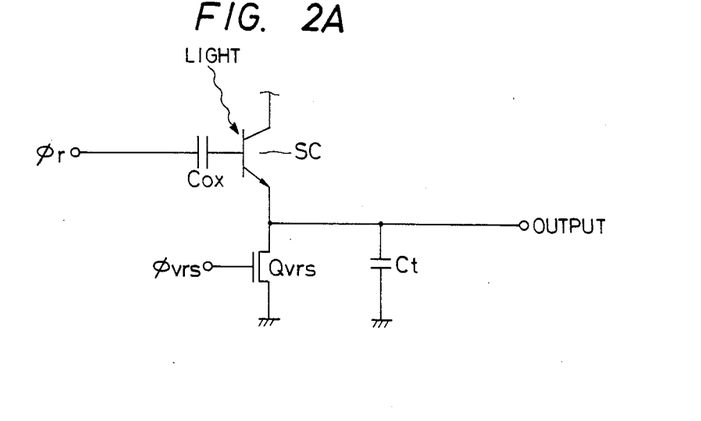
FIG. 2A is a diagram showing a fundamental drive circuit to drive a photosensor.
Figure 2B:
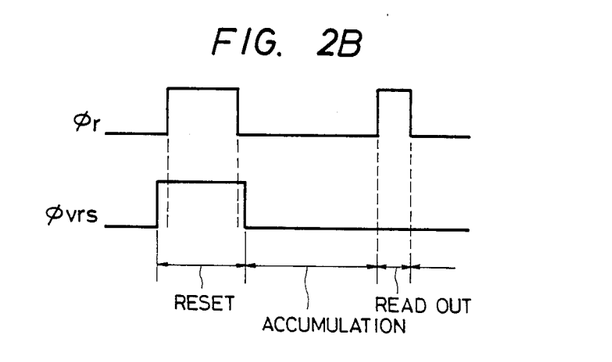
FIG. 2B is a timing chart for explaining the operation of this drive circuit.

FIG. 2A is a diagram showing a fundamental drive circuit to drive the photosensor. FIG. 2B is a timing chart for explaining the operation of this drive circuit.

In FIG. 2A, a photosensor SC comprises a bipolar transistor and a capacitor $C_{0x}$ to control the base potential. When the carriers excited by the incident light are accumulated in the base of the bipolar transistor, the photoelectric converting operation is executed.

A drive pulse $\phi_r$ of a positive voltage is input to a capacitor electrode of the photosensor SC. An emitter electrode is grounded through a transistor $Q_{vrs}$. A pulse $\phi_{vrs}$ is input to a gate electrode of the transistor $Q_{vrs}$. Further, a capacitor $C_t$ for temporary accumulation is connected to the emitter electrode.

In the foregoing constitution, by applying pulses at timings as shown in FIG. 2B, the photosensor executes the operations of reset, accumulate, and read out, respectively.

First, the transistor $Q_{vrs}$ is turned on by the pulse $\phi_{vrs}$ and the emitter electrode of the photosensor SC is grounded. In this state, the pulse $\phi_r$ is input to the capacitor electrode. Thus, the bipolar transistor operates and the carriers accumulated in the base are eliminated (resetting operation).

After the operation to accumulate the carriers corresponding to the incident light was performed, the emitter side is set into the floating state and the pulse $\phi_r$ is applied. Thus, the bipolar transistor operates and the accumulated voltage in the base is read out to the emitter side (reading operation) and temporarily stored into the capacitor $C_t$.

Figure 3:
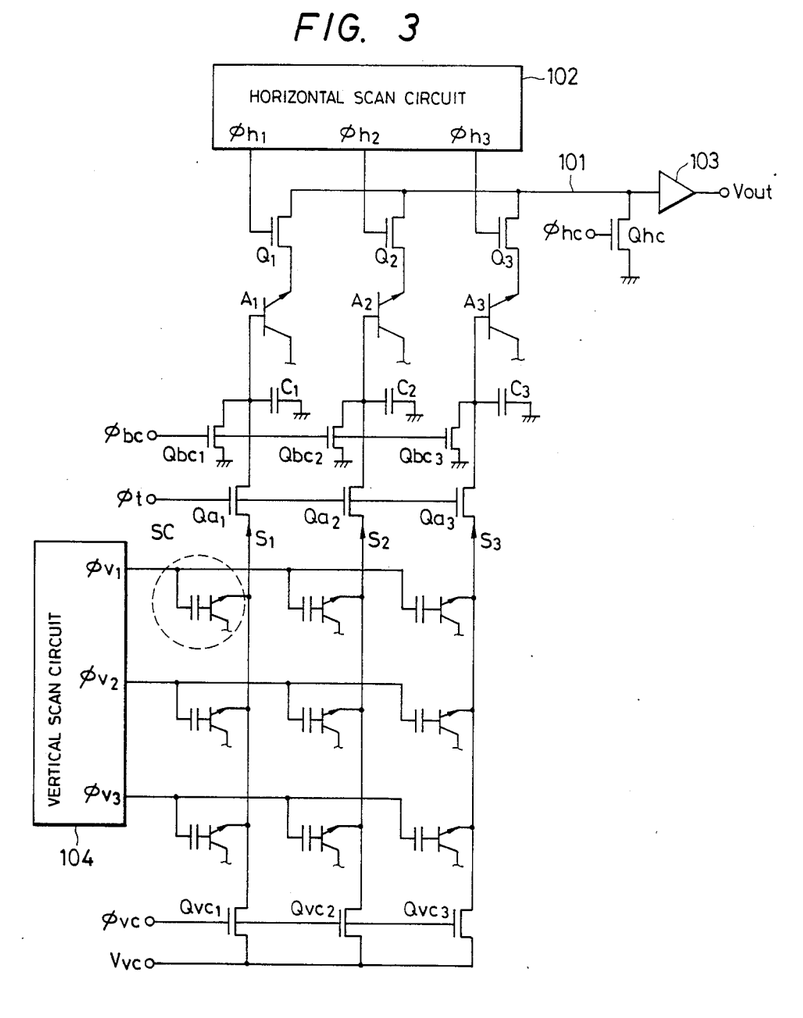
FIG. 3 is a circuit diagram of an example of an image pickup device comprising a signal reading circuit and a photosensor.

FIG. 3 is a circuit diagram of an example of an image pickup device constituted using the signal reading circuit of the embodiment and the foregoing photosensor. In this case, an example of an area sensor comprising of photosensors arranged in a 3×3 matrix has been shown in FIG. 3 for convenience of explanation. However, there is no essential difference even in the case of using an arbitrary number of sensors of m×n.

Since the section of this embodiment is similar to the constitution shown in FIG. 1, the same parts and components as those in FIG. 1 are designated by the same reference numerals and their descriptions are omitted.

The (3×3) photosensors SC are arranged in a matrix form to constitute an area sensor, thereby constituting an image pickup section. The capacitor electrodes of the photosensors SC are commonly connected every horizontal line. Vertical scan pulses $\phi_v$ ($\phi_{v1}$ to $\phi_{v3}$) are supplied to the capacitor electrodes from a vertical scan circuit 104.

On the other hand, the emitter electrodes of the photosensors SC are commonly connected every vertical line and respectively connected to the transfer transistors $Q_a$ ($Q_{a1}$ to $Q_{a3}$) Further, a constant voltage $V_{vc}$ is applied to each vertical line through reset transistors $Q_{vc}$ ($Q_{vc1}$ to $Q_{vc3}$). The pulses $\phi_{vc}$ are input to the gate electrodes of the transistors $Q_{vc}$.

Figure 4:
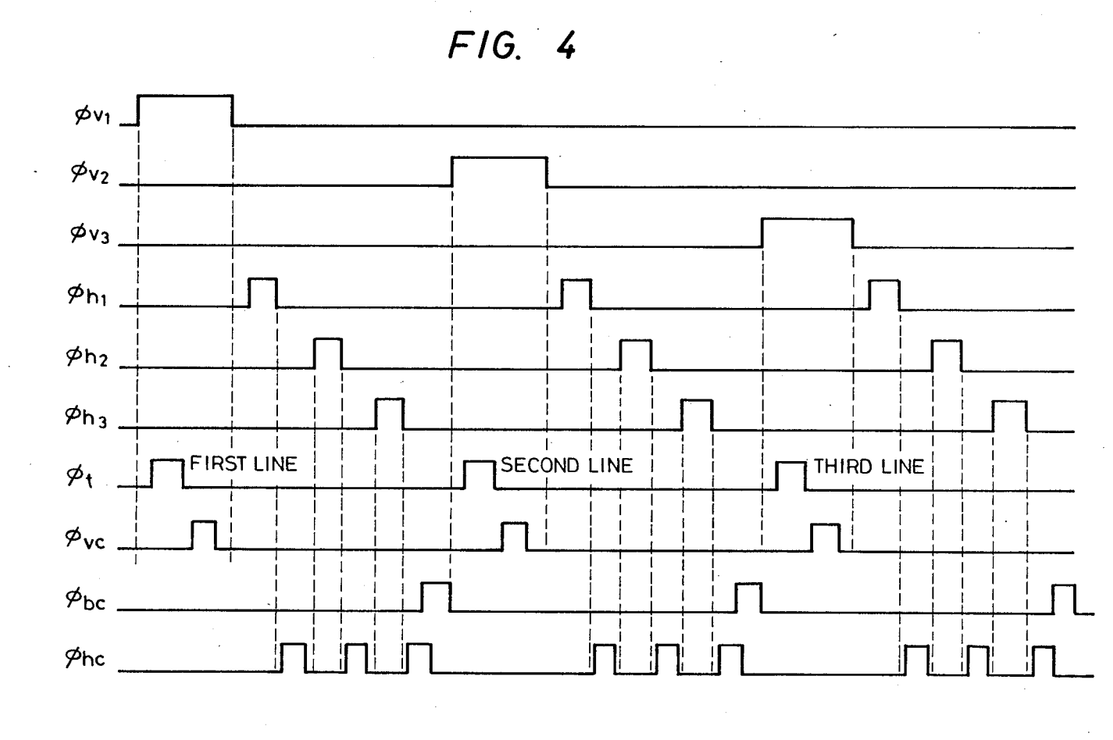
FIG. 4 is a timing chart for explaining the operation of the image pickup device of FIG. 3.

FIG. 4 is a timing chart for explaining the operation of the image pickup device.

First, it is assumed that the charges generated by the light excitation have already been accumulated in each photosensor SC. In this state, the scan pulse $\phi_{v1}$ is output from the vertical scan circuit 104. The signals S are read out to the emitter side by the reading operations of the photosensors SC of the first row.

The transistor $Q_a$ is turned on by the transfer pulse $\phi_t$ and the signals S of the first row are accumulated in the capacitors C. Then, when the pulse $\phi_t$ falls, the transistor $Q_{vc}$ is turned on by the pulse $\phi_{vc}$ and the vertical line is reset.

Subsequently, the horizontal scan pulses $\phi_h$ are sequentially output from the horizontal scan circuit 102. The signals amplified by the amplifier A are sequentially read out to the signal line 101 and output as an image signal $v_{out}$ through the amplifier 103. In this case, whenever each signal is output, the transistor $Q_{hc}$ is turned on by the pulse $\phi_{hc}$ and the signal line 101 is reset. On the other hand, when the signals of the first row are read out, the transistor $Q_{bc}$ is turned on by the pulse $\phi_{bc}$ and the residual charges in the capacitors C are eliminated.

The foregoing operations are also similarly executed with respect to the second and third rows. Thus, the signals of all of the photosensors SC can be serially output. Further, as already mentioned above, since the signals are amplified by the amplifiers A, the outputs do not decrease. In addition, the signals are read out to the signal line 101 through the ON resistances of the transistors Q. Thus, the variation in signal due to the amplifiers A is suppressed.

Figure 5:
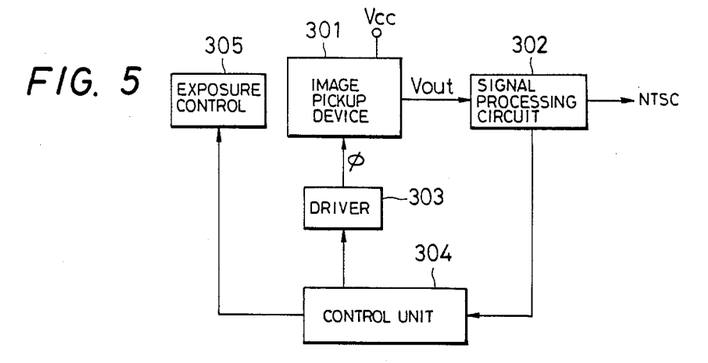
FIG. 5 is a schematic diagram of an example of an image pickup apparatus using an image pickup device.

FIG. 5 is a schematic diagram of an example of an image pickup apparatus using the above-described image pickup device.

In the diagram, an image pickup device 301 is an area sensor including the circuit shown in FIG. 3 and having an array of (m×n) photosensors. The output signal $V_{out}$ of the image pickup device 301 is subjected to the processes such as gain adjustment and the like by a signal processing circuit 302. Thus, a standard television signal such as an NTSC signal or the like is output.

The foregoing respective pulses to drive the image pickup device 301 are supplied from a driver 303. The driver 303 is driven by the control of a control unit 304. The control unit 304 adjusts a gain and the like of the signal processing circuit 302 on the basis of an output of the image pickup device 301 and also controls an exposure control 305, thereby adjusting an amount of incident light to the image pickup device 301.

In the NTSC signal obtained using the embodiment as explained above, since the variation in output signal is suppressed as mentioned above, even if it is reproduced by a television receiver, the fixed pattern noise by the amplifiers A is suppressed. An image of good quality can be obtained.

As a photosensor, the invention is not limited to the foregoing base accumulating type photosensor but can also use another type of photosensor such as an electrostatic inductive type or the like.

On the other hand, the present invention is not limited to an image pickup device but can be also applied to a general signal reading circuit As described in detail above, since the signal reading circuit according to the embodiment reads out the signals to the signal line by the amplifiers and resistor means, for example, even if the signals are transferred from the accumulation capacitance $C_t$ to the capacitance $C_h$ of the signal line, the gain can be set to about 1. The signal level does not decrease Therefore, the load of the processing circuit and the like at the post stage can be reduced and the load capacitance can be further reduced. Thus, high speed operation can be performed.

On the other hand, since the foregoing amplifiers drive the signal line through the resistor means, the output currents of the amplifiers are limited by the resistor means and a variation in readout signal can be suppressed. Therefore, for example, if the invention is applied to read out the image pickup signals, the fixed pattern noise due to a amplifiers can be suppressed and the reproduced image of a good quality can be derived.

The second embodiment of the invention will now be described in detail hereinbelow with reference to the drawings.

Figure 7:
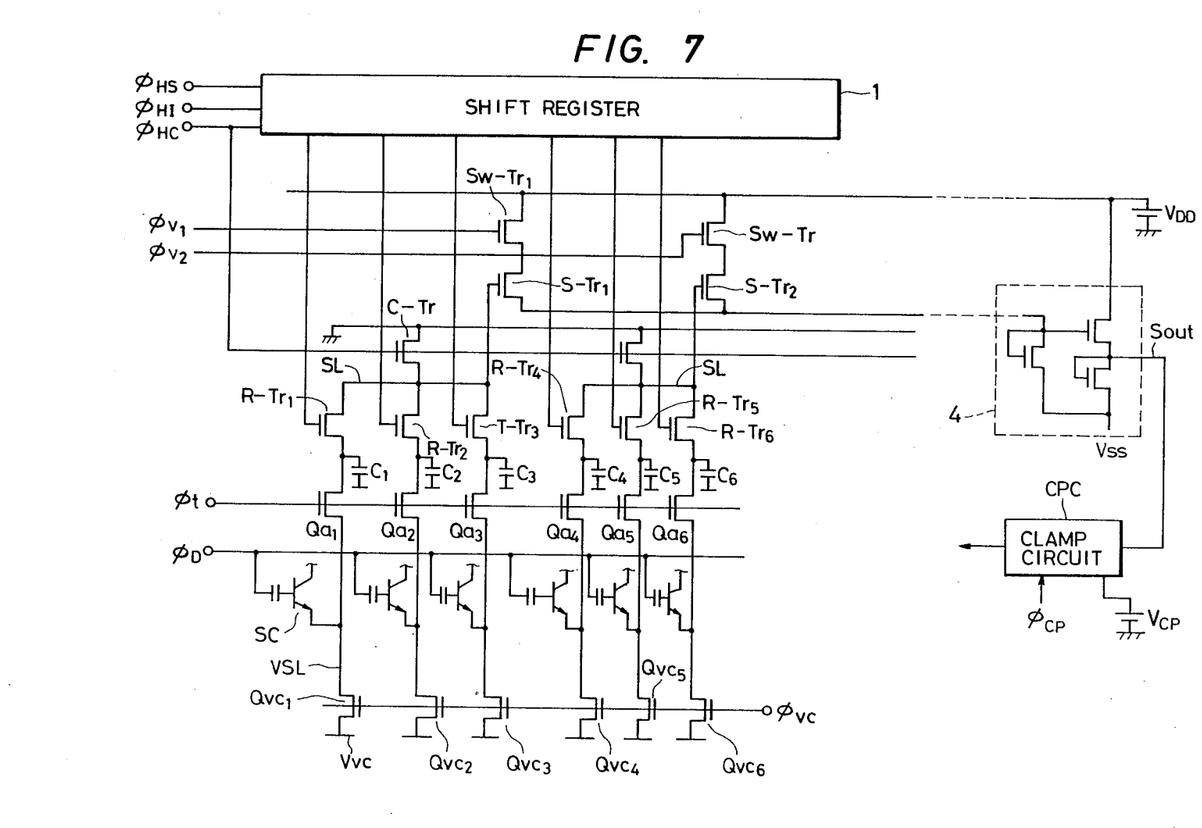
FIG. 7 is a diagram showing a second embodiment of a photoelectric converting apparatus according to the invention.
Figure 8:
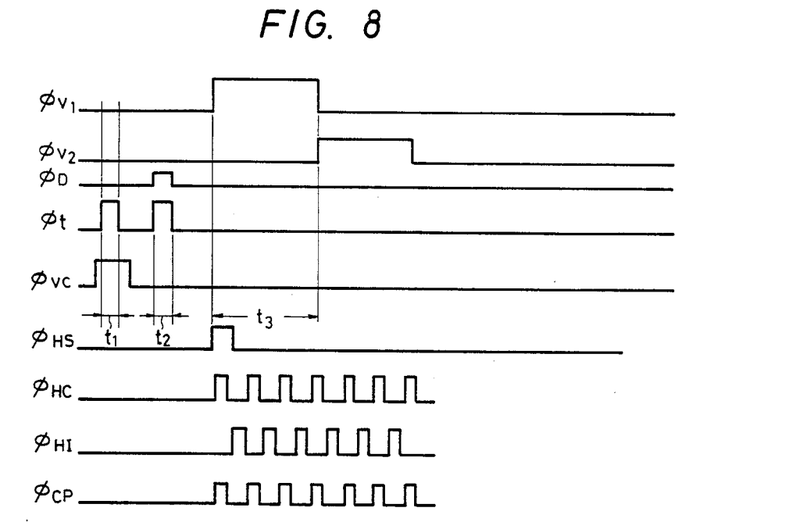
FIG. 8 is a timing chart for explaining the operation of the second embodiment.

FIG. 7 is a diagram showing a constitution of a photoelectric converting apparatus in the second embodiment of the invention. FIG. 8 is a timing chart for this apparatus.

In the diagram, a horizontal shift register 1 is made operative by a pulse $\phi_{HS}$ and sequentially sets one of a plurality of output lines to the high level by pulses $\phi_{HI}$ and $\phi_{HS}$ having opposite phases.

One of the output lines of the shift register 1 is set to the high level for the period of time when the pulse $\phi_{HI}$ is at the high level.

Reference character SC denotes a bipolar transistor in which the capacitor constituting one pixel is connected to a base. Its emitter is connected to a vertical signal line $V_{SL}$ and its collector is connected to a constant voltage source.

$Q_{VC1}$ to $Q_{VC6}$ denote transistors to clear the residual signals on the vertical signal lines $V_{SL}$ for the period of time when the pulse $\phi_{VC}$ is at the high level.

$Q_{a1}$ to $Q_{a5}$ indicate transistors to selectively connect the signal lines $V_{SL}$ with the capacitors $C_n$ (n is an integer).

R-$T_{rn}$ represents transistors to sequentially lead the signals accumulated in the capacitors $C_n$ to the signal lines SL by the scan output of the shift register.

C-$T_r$ indicates a transistor to clear the residual charges on the signal line SL.

S-$T_{rm}$ (m is an integer) denotes buffer amplifiers. SW-$T_{rm}$ indicate transistors to selectively connect a power source $V_{DD}$ to each transistor S-$T_{rm}$. When a pulse $\phi_{Vm}$ is at the high level, the transistors SW-$T_{rm}$ are turned on. Reference numeral 4 denotes an output amplifier. CPC represents a clamp circuit to clamp an output of the amplifier 4 to a clamp voltage $V_{CP}$ at the timing of a pulse $\phi_{CP}$.

This embodiment has the following features.
(1) A capacitor $C_n$ is provided for each signal line $V_{SL}$.
(2) By providing the buffer amplifiers S-$T_{rm}$ to read out the signals of the capacitors $C_n$, the reduction in output due to the division of the capacitance is suppressed.
(3) The transistors SW-$T_{rm}$ which are turned on or off by the pulse $\phi_{v1}$ are provided to minimize the electric power consumption of the buffer amplifiers and the heat generation due to this.
(4) One buffer amplifier is provided every plurality of vertical signal lines in order to prevent an increase in chip area by the transistors SW-$T_{rm}$ and S-$T_{rm}$, and the like.

The operation of this embodiment will now be described with reference to FIG. 8.

First, the unnecessary charges on the vertical signal lines $V_{SL}$ and in the temporary accumulation capacitances $C_1$ to $C_6$ are eliminated for the period of time $t_1$.

The signals of the pixels are transferred to the capacitance $C_n$ by the pulses $\phi_D$ and $\phi_t$ for the period of time $t_2$. The signal charges accumulated in $C_t$ are read out to the output amplifier 4 through the buffer amplifiers S-$T_{rm}$ by sequentially turning on or off the readout transfer transistors R-$T_r$ synchronously with $\phi_{HI}$.

At this time, the power source is supplied to only the buffer amplifier S-$T_{rm}$ corresponding to the reading operation.

Namely, the period of time $t_3$ when the transistor SW-$T_{r1}$ is made conductive by the pulse $\phi_{v1}$ corresponds to the period of time when the signals in the temporary accumulation capacitances $C_1$, $C_2$, and $C_3$ are read out.

The common signal line SL is held to a predetermined reference potential by a pulse $\phi_{HC}$ each time one bit is transferred.

The reason why the line SL is held to the reference potential is to eliminate the residual charges and to further correct a variation $\Delta V_T$ in the threshold levels of the buffer amplifiers S-$T_m$. Namely, by clamping the portion corresponding to the reference voltage of the output signal $S_{out}$ every bit by the pulse $\phi_{CP}$, the variation $\Delta V_T$ can be eliminated.

Figure 9:
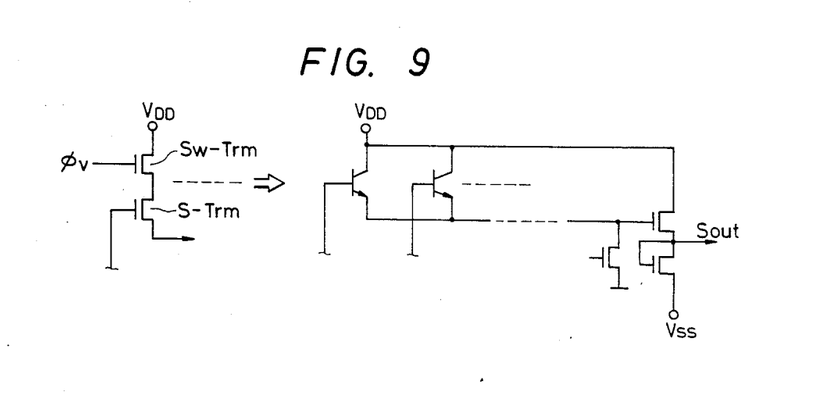
FIG. 9 is a diagram of the main section in a third embodiment.

Although the buffer amplifiers S-$T_{rm}$ in the embodiment of FIG. 7 have been constituted by MOS transistors, bipolar transistors can be also used in place of the MOS transistors as shown in the third embodiment of FIG. 9. When the buffer amplifiers are constituted by bipolar transistors, the transistors SW-$T_{rm}$ can be also omitted. This is because the bias components of the signals on the transistors C-$T_r$ in the reading operation forwardly bias the bipolar transistors.

Figure 10:
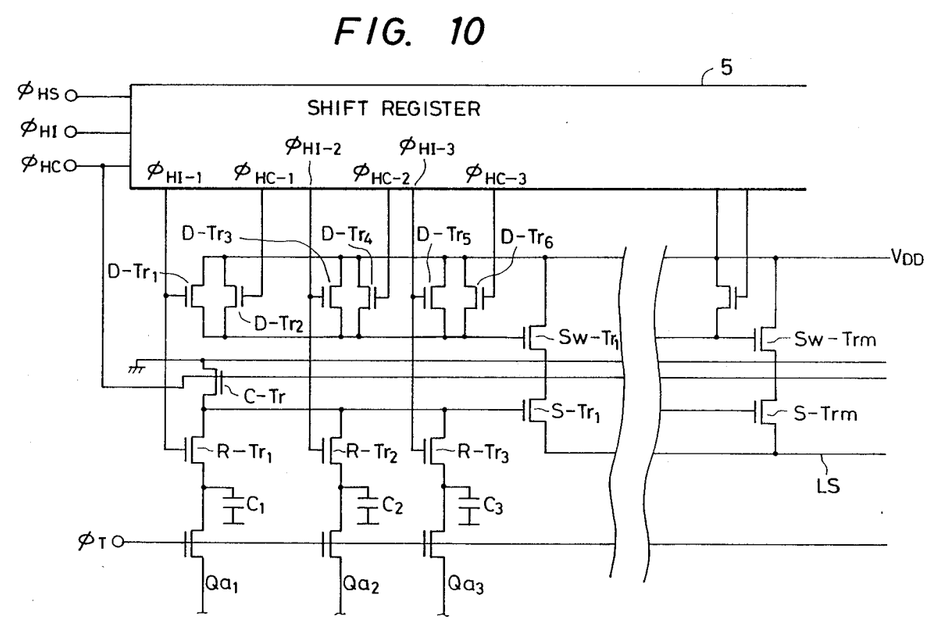
FIG. 10 is a diagram of the main section in fourth embodiment.

FIG. 10 is a diagram showing a fourth embodiment. In FIG. 10, the power supplying transistors SW-$T_{rm}$ are turned on or off by the output pulses $\phi_{HI}$ and $\phi_{HC}$ of a shift register 5.

Namely, in FIG. 10, the same parts and components as those shown in FIGS. 7 to 9 are designated by the same reference numerals and they have the same constitutions.

In the fourth embodiment, a plurality of transistors D-$T_{rn}$ are provided for the gates of the transistors SW-$T_{rm}$. The transistors D-$T_{rn}$ are sequentially turned on by the scan outputs $\phi_{HI}$ and $\phi_{HC}$ of the shift register 5. This point differs from the constitution shown in FIG. 7.

The operation will now be explained hereinbelow.

The pulses $\phi_{HC}$, $\phi_{HI}$, $\phi_T$, $\phi_{CP}$, etc. are driven at the same timings as those shown in FIG. 8. The pulses $\phi_{v1}$, $\phi_{v2}$, ..., $\phi_{vm}$ do not exist in this embodiment.

It is now assumed that the signals have already been accumulated in the capacitor $C_n$.

First, the transistors D-$T_{r1}$ and R-$T_{r1}$ are turned on by the pulse $\phi_{HI-1}$. Thus, the transistor SW-$T_{r1}$ is turned on. The signal in the capacitor $C_1$ is amplified by the transistor S-$T_{r1}$ and output to an output line LS.

Next, the pulse $\phi_{HI-1}$ is set to the low level and the pulse $\phi_{HC-1}$ is set to the high level, so that the transistors D-$T_{r2}$ and C-$T_r$ are turned on. Thus, a reference level of "0" is input to the base of the buffer transistor S-$T_{r1}$ and the transistor SW-$T_{r1}$ is also turned on. Therefore, this signal is output to the output line LS. This signal is clamped by the same clamp circuit CPC as that shown in FIG. 7 by the clamp pulse $\phi_{CP}$ at the same timing as that of the pulse $\phi_{HC}$.

In a manner similar to the above, the signal in the capacitor $C_2$ and the signal at the reference level "0" are dot-sequentially output by the pulses $\phi_{HI-2}$ and $\phi_{HC-2}$. These operations are sequentially executed.

According to this embodiment, since the pulses $\phi_{v1}$, $\phi_{v2}$, ..., $\phi_{vm}$ are unnecessary as compared with the second embodiment, the number of pulse input terminals and the wiring area can be reduced.

According to the embodiment, the reduction in signal of the photoelectric converting pixel due to the division of the capacitance can be suppressed even if the capacitor means is enlarged. Further, the heat generated by the first amplifier can be reduced and the constitution of the first amplifier can be simplified.

We claim:

1. An image pickup apparatus comprising:
   a plurality of photoelectric conversion cells for producing electrical signals in response to incident light:
   a plurality of storage means for simultaneously reading out signals from said conversion cells and temporarily storing the signals;
   a plurality of first amplifiers for amplifying outputs of said plurality of storage means;
   a plurality of resistor means, having resistance values, for restricting outputs of said plurality of first amplifiers;
   scanning means for changing the resistance values of said plurality of resistor means in order; and
   a second amplifier for commonly amplifying the signals provided by said plurality of first amplifiers through said plurality of resistor means.

2. A circuit according to claim 8, wherein said resistor means is a resistance when said switching means is conductive.

3. A circuit according to claim 1 wherein said first amplifier is a bipolar transistor.

4. A circuit according to claim 1, wherein said storage means comprises a capacitor to hold the signal which is input to said first amplifier.

5. A circuit according to claim 4, further comprising switching means for selectively discharging said capacitor.

6. An image pickup apparatus according to claim 1, wherein said photoelectric conversion cells include a third amplifying means.

7. An image pickup apparatus according to claim 1, wherein said plurality of storage means stores electrical signals of cells of one row.

8. An image pickup apparatus according to claim 1, further comprising switching means for selectively disconnecting connections between each of said photoelectric conversion cells and each storage means corresponding to said each cell.

9. An image pickup apparatus comprising:
   a plurality of photoelectric conversion cells for producing electrical signals in response to incident light;
   a plurality of storage means for simultaneously reading out signals from said plurality of conversion cells and temporarily storing the signals;
   a plurality of first amplifying means of a quantity less than that of said plurality of storage means, for selectively amplifying outputs of said plurality of storage means;
   a plurality of resistor means, having resistance values, for restricting outputs of said plurality of first amplifying means;
   scanning means for changing the resistance values of said plurality of resistor means in order; and a second amplifier for commonly amplifying the signals provided by said plurality of first amplifying means through said plurality of resistor means.

10. An apparatus according to claim 9, wherein said first amplifying means is an MOS transistor.

11. An apparatus according to claim 9, wherein said first amplifying means is a bipolar transistor.

12. An apparatus according to claim 9, wherein said storage means comprises capacitor means coupling said second amplifier and said first amplifying means.

13. An apparatus according to claim 1, wherein said resistor means comprises switching means for selectively supplying a power source to said first amplifying means.

14. An image pickup apparatus according to claim 9, wherein said photoelectric conversion cells include a third amplifying means.

15. An image pickup apparatus according to claim 9, wherein said plurality of storage means stores electrical signals of cells of one row.

16. An image pickup apparatus according to claim 9, further comprising switching means for selectively disconnecting connections between each of said photoelectric conversion cells and each storage means corresponding to said each cell.

* * * * *

UNITED STATES PATENT AND TRADEMARK OFFICE
CERTIFICATE OF CORRECTION

PATENT NO. : 4,967,067

DATED : October 30, 1990

INVENTOR(S) : Seiji Hashimoto, et al.

It is certified that error appears in the above-identified patent and that said Letters Patent is hereby corrected as shown below:

On the title page, after the inventors, insert the following assignment data:
--[73] Assignee: Canon Kabushiki Kaisha, Tokyo, Japan--;

On the title page, before item [57] ABSTRACT, insert the following:
--Attorney, Agent, or Firm - Fitzpatrick, Cella, Harper & Scinto--.

Signed and Sealed this

Fifteenth Day of October, 1991

*Attest:*

HARRY F. MANBECK, JR.

*Attesting Officer*      *Commissioner of Patents and Trademarks*